Jan. 31, 1956     D. T. PHILLIPS     2,733,073
ADJUSTABLE CHUCK
Filed May 23, 1952
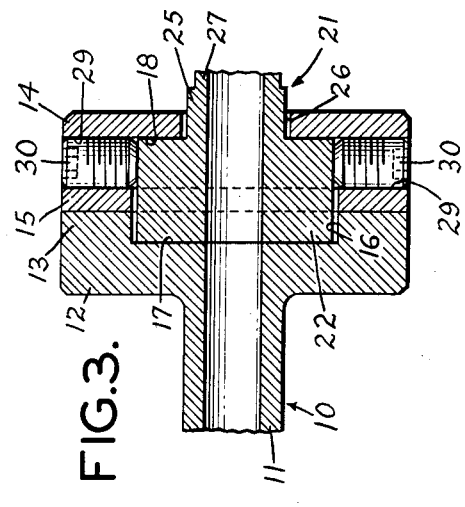
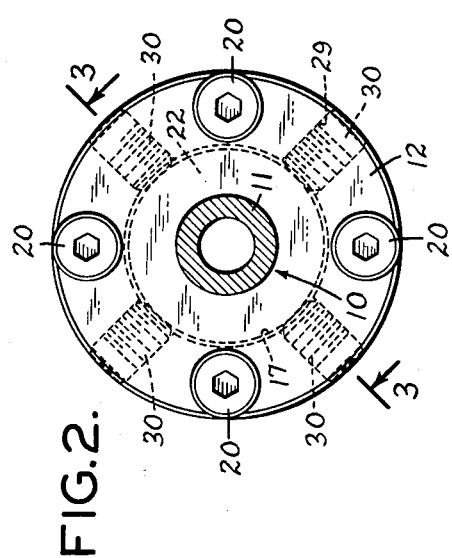
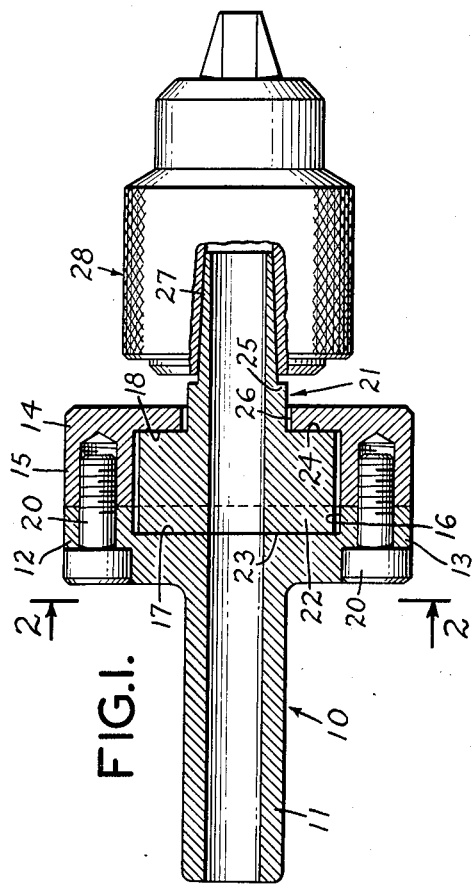
INVENTOR.
DAVID T. PHILLIPS
HIS ATTORNEYS.

United States Patent Office 2,733,073
Patented Jan. 31, 1956

2,733,073

ADJUSTABLE CHUCK

David T. Phillips, Scranton, Pa., assignor to Consolidated Molded Products Corporation, Scranton, Pa., a corporation of Delaware Application May 23, 1952, Serial No. 289,555

3 Claims. (Cl. 279—9)

This invention relates to adjustable chucks and more particularly to adjustable chuck holding apparatus whereby eccentricity which occurs due to wear of the chuck may be effectively eliminated.

The chucks for use with lathes, drill presses and the like, even when new, seldom hold a drill or other similar tool accurately with respect to the axis of rotation of the chuck. As much as .003 to .005 deviation may be found even in new chucks. This deviation increases as the chuck ages and becomes worn, with the result that holes drilled using the chuck will be untrue, for example, elliptical, egg-shaped or oversize.

One object of the present invention is to provide an adjustable chuck holder whereby the chuck axis may be located precisely on the main axis of rotation.

Another object of the invention is to provide an adjustable chuck holder whereby eccentricity can be overcome by means of a simple and accurate adjustment.

These and other features and objects may be attained according to the invention by the use of a chuck holder including a driving portion adapted to be rotated by a lathe, drill press or the like and a relatively adjustable driven part on which the chuck is mounted. The driving portion includes a hollow housing which is mounted on the spindle of a drill press, lathe or the like. The housing has an internal cavity for receiving a driven part or member on which a chuck can be mounted. The driven member has squared end surfaces which fit closely between opposed parallel flat surfaces in the cavity to retain the housing and the driven member against relative tilting movement. The driven member is of somewhat smaller diameter than the smallest transverse internal dimension of the cavity so that the driven member can move radially in any direction without tilting. A circumferential array of adjusting screws is provided in the housing portion to determine the radially adjusted position of the driven member. The driven member may be brought into precise alignment with the axis of the spindle of a drill press or a lathe by means of the adjusting screws and locked by tightening these screws.

The driven member is formed with a tapered quill or spindle portion which is adapted to carry an adjustable chuck for receiving a cutting tool or drill, for example, and the radial adjustment of the driven element is determined with respect to the axis of the tool. Thus the tool axis may be brought into precise alignment with the main axis and there maintained until a further adjustment is required due to wear of parts, for example.

The invention may be better understood by reference to the accompanying drawing in which Fig. 1 is a side view partly in longitudinal section of an adjustable chuck mounting assembly formed in accordance with the present invention;

Fig. 2 is a view in transverse section taken on the line 2—2 of Fig. 1 looking in the direction of the arrows; and Fig. 3 is a fragmentary view in transverse section taken on the line 3—3 of Fig. 2.

Referring to the drawing, the invention is shown as embodied in an adjustable chuck supporting assembly including a driving member 10 comprising a shaft or quill 11 adapted to be connected to a lathe or drill press spindle. The driving member 10 has a disk-like member 12 provided with an annular rim 13 concentric with the axis of the shaft 11. A cup-shaped member 14 has its rim 15 abutting against the rim 13 to form a cylindrical cavity 16 bounded by the rims 13 and 15 of the members 12 and 14, and the opposed inner faces 17 and 18 of the members 12 and 14, respectively. Suitable retaining means, such as a plurality of annularly arrayed screws 20, may be utilized to clamp the members 12 and 14 together, the screw 20 extending through the member 12 and being screwed into the threaded, blind holes formed in the rim 15.

Received within the cavity 16 is a driven member 21 having an enlarged cylindrical head portion 22, the outside diameter of which is smaller than the inside diameter of the cavity. The head portion 22 has flat parallel end surfaces 23 and 24 which are adapted to be engaged respectively, by the surfaces 17 and 18 of the members 12 and 14 which also are flat and parallel. The driven member 21 includes an axial extension 25 which extends loosely through the circular opening 26 in the base of the cup-shaped member 14, which extension portion 25 carries an axially extending tapered quill or solid shaft 27 upon which a conventional chuck 28 may be mounted in the usual way.

Four tapped radial through-bores 29 are formed in the rim 15 of the member 14 to receive the set-screws 30, the inner ends of which are adapted to engage the periphery of the head portion 22.

In use, the chuck 28 is brought into approximate alignment with the main axis of rotation of the drill press, lathe or the like. The screws 30 are then adjusted to shift the driven member 21 radially until the axis of the chuck 28 or a tool held therein falls into precise alignment with the main axis. The screws 30 are then tightened to hold the head portion 22 against rotation relative to the member 10. If desired, the height of the head 22 may be made slightly greater than the height of the cavity 16 when the rims 13 and 15 are engaged so that the end surfaces 17 and 18 can be clamped tightly against the ends of the head 22. The screws 20 may be loosened to permit adjustment of the chuck and then tightened to clamp the walls 17 and 18 of the members 12 and 14, respectively, against the head portion 22 to fix the latter tightly in position.

It will be understood that adjustment may be made in the alignment of the chuck as needed to compensate for wear which customarily throws chuck axes out of alignment.

It will be understood, further, that various modifications may be made in the illustrated embodiment of the invention without departing from the scope of the invention. Thus, for example, head portion 22 may be polygonal instead of cylindrical and other means than the screws 20 and/or 30 may be used to provide the driving connection between the driven member 21 and driving member 10. The form of the invention described, therefore, should be considered as illustrative and not as limiting the scope of the following claims.

I claim:

1. An adjustable holder for overcoming eccentricity of a chuck comprising a hollow housing having a cavity therein, having parallel walls at opposite ends of said cavity, and a side wall surrounding said cavity, a shaft perpendicular to said walls and projecting from one end of said housing, an opening at the opposite end of said housing communicating with said cavity, a member for supporting a chuck, said member having a head mounted in said cavity for radial movement relative to the axis of said shaft and a shaft thereon extending through said opening to receive said chuck, said head having parallel end walls tightly fitting between and in contact with the parallel walls in said housing to prevent relative tilting of said head and said housing, and radially movable adjusting means mounted in the side wall of said housing and engaging the sides of said head for shifting and positioning said head.

2. An adjustable holder for overcoming eccentricity in a chuck comprising a shaft, a hollow housing fixed to one end of said shaft, said housing having side and end walls defining a cavity within said housing, said end walls having interior, opposed parallel surfaces perpendicular to the axis of said shaft, the end wall opposite from said shaft having a central opening therethrough, a member for supporting a chuck, said member having a head mounted for movement in all radial directions in said cavity and having parallel end surfaces engaging said interior opposed surfaces of said housing in tightly fitted contact, a shaft on said head extending perpendicular to the ends thereof and projecting loosely through said opening, said shaft being of substantially smaller diameter than said opening to enable said shaft to be moved transversely of said opening in all directions, and a plurality of adjusting screws mounted in said side wall of said housing and extending radially therethrough into engagement with said head to adjust said head radially and retain it in adjusted position.

3. The adjustable holder set forth in claim 2 in which said housing comprises two opposed cup-shaped members having rims thereon in confronting edge-to-edge engagement forming the side wall of said housing, and a series of screws spaced around said rims and detachably securing said cup-shaped members together and drawing them into tight engagement with the parallel end surfaces of said head.

References Cited in the file of this patent

UNITED STATES PATENTS

| | | |
|---|---|---|
| 68,998 | Lavey | Sept. 17, 1867 |
| 1,317,008 | Dohner et al. | Sept. 23, 1919 |
| 2,010,983 | Ferguson | Aug. 13, 1935 |
| 2,435,396 | Koch | Feb. 3, 1948 |
| 2,497,426 | Toth | Feb. 14, 1950 |
| 2,654,610 | De Vlieg | Oct. 6, 1953 |